(12) United States Patent (10) Patent No.: US 10,107,152 B2
Yasuda (45) Date of Patent: Oct. 23, 2018

(54) SEAL RING

(71) Applicant: NTN CORPORATION, Osaka (JP)

(72) Inventor: Ken Yasuda, Mie (JP)

(73) Assignee: NTN CORPORATION, Osaka (JP)

( * ) Notice: Subject to any disclaimer, the term of this patent is extended or adjusted under 35 U.S.C. 154(b) by 57 days.

(21) Appl. No.: 15/128,984

(22) PCT Filed: Mar. 25, 2015

(86) PCT No.: PCT/JP2015/059098
§ 371 (c)(1),
(2) Date: Sep. 25, 2016

(87) PCT Pub. No.: WO2015/147042
PCT Pub. Date: Oct. 1, 2015

(65) Prior Publication Data
US 2017/0107865 A1    Apr. 20, 2017

(30) Foreign Application Priority Data

Mar. 25, 2014 (JP) .................................. 2014-062793

(51) Int. Cl.
*F01L 1/344* (2006.01)
*F16J 15/16* (2006.01)
(Continued)

(52) U.S. Cl.
CPC ............... *F01L 1/3442* (2013.01); *F01L 1/34* (2013.01); *F01L 1/344* (2013.01); *F01L 9/02* (2013.01);
(Continued)

(58) Field of Classification Search
CPC .......... F01L 1/3442; F01L 2001/34483; F01L 2001/34469; F01L 1/34; F01L 1/344;
(Continued)

(56) References Cited

U.S. PATENT DOCUMENTS 5,934,680 A    8/1999  Kakehi
6,318,319 B1 *  11/2001  Miyasaka ............... F01L 1/344
                                                              123/90.17
(Continued)

FOREIGN PATENT DOCUMENTS

DE    19740215 A1    3/1998
DE    19713455 A1    10/1998
(Continued)

OTHER PUBLICATIONS

International Search Report for PCT/JP2015/059098 dated Jun. 30, 2015.
(Continued)

*Primary Examiner* — Mark Laurenzi
*Assistant Examiner* — Wesley Harris
(74) *Attorney, Agent, or Firm* — Hedman & Costigan, P.C.; James V. Costigan; Kathleen A. Costigan

(57) ABSTRACT

The present invention provides a seal ring, for a variable valve timing system, which is resistant to breakage when the seal ring is expanded at a seal ring mounting time even in a case where the seal ring is thick and allowed to have a complicated configuration by performing injection molding and achieve a small oil leak, a low degree of friction, and improved wear resistance. In the variable valve timing system having a camshaft (5) for driving an intake valve of an internal combustion engine and an exhaust valve thereof, an inner rotational body (3) fixed to the camshaft (5), an outer rotational body (4) making a rotational motion relative to the inner rotational body (3) by supply of hydraulic oil at a time of altering opening and closing timings of the intake valve and the exhaust valve, and a shaft body (2) mounted on rotational body (3).

5 Claims, 6 Drawing Sheets

(51) Int. Cl.
*F16J 15/3272* (2016.01)
*F01L 9/02* (2006.01)
*F04B 27/18* (2006.01)
*F01L 1/34* (2006.01)

(52) U.S. Cl.
CPC ......... *F04B 27/1804* (2013.01); *F16J 15/164* (2013.01); *F16J 15/3272* (2013.01); *F01L 2001/34446* (2013.01); *F01L 2001/34469* (2013.01); *F01L 2001/34479* (2013.01); *F01L 2001/34483* (2013.01); *F04B 2027/1813* (2013.01); *F04B 2027/1827* (2013.01); *Y02T 10/18* (2013.01)

(58) Field of Classification Search
CPC ............... F01L 9/02; F01L 2001/34446; F01L 2001/34479; F04B 27/1804; F04B 2027/1827; F04B 2027/1813; Y02T 10/18; F16J 15/164; F16J 15/3272
See application file for complete search history.

(56) References Cited

U.S. PATENT DOCUMENTS

| | | | | |
|---|---|---|---|---|
| 6,418,895 | B1* | 7/2002 | Miyasaka | F01L 1/344 123/90.17 |
| 6,943,137 | B2* | 9/2005 | Saito | C08K 7/06 508/100 |
| 2002/0062803 | A1* | 5/2002 | Sato | F01L 1/022 123/90.17 |
| 2002/0152978 | A1* | 10/2002 | Todo | F01L 1/3442 123/90.17 |
| 2003/0144156 | A1 | 7/2003 | Saito | |
| 2005/0028773 | A1* | 2/2005 | Komaki | F01L 1/022 123/90.17 |
| 2011/0073055 | A1* | 3/2011 | Kobayashi | F01L 1/3442 123/90.17 |
| 2011/0085921 | A1* | 4/2011 | Kato | F01L 1/3442 417/213 |
| 2014/0008876 | A1 | 1/2014 | Nagai | |

FOREIGN PATENT DOCUMENTS

| | | |
|---|---|---|
| DE | 19738779 A1 | 3/1999 |
| DE | 10259380 A1 | 7/2003 |
| JP | 2001-059574 A | 3/2001 |
| JP | 2003-183497 A | 7/2003 |
| JP | 2004-143971 A | 5/2004 |
| JP | 2006-342970 A | 12/2006 |
| JP | 2008-255823 A | 10/2008 |
| KR | 2003-0051395 A | 6/2003 |
| WO | 2005/036677 A1 | 4/2005 |

OTHER PUBLICATIONS

Supplementary European Search Report dated Nov. 16, 2017.
English Abstract for DE 19740215 A1 dated Mar. 19, 1998.
English Abstract for DE 19738779 A1 dated Mar. 18, 1999.
English Abstract for DE 19713455 A1 dated Oct. 15, 1998.

* cited by examiner (a)

Detail of abutment (b)

SEAL RING

TECHNICAL FIELD

The present invention relates to a seal ring for sealing hydraulic oil of a variable valve timing system for controlling valve opening and closing timings of an intake valve of an internal combustion engine and an exhaust valve thereof.

BACKGROUND ART

As described in patent documents 1 through 3, a seal ring for sealing hydraulic oil is used in a hydraulically driven variable valve timing system (VTC: Valve Timing Control) of an internal combustion engine. For example, as shown in FIGS. 1 through 3, in the variable valve timing system of the patent document 1, a pair of hydraulic oil chambers is formed between the housing (outer rotational body) disposed at the crankshaft side and the vane member (inner rotational body) disposed at the camshaft side. The hydraulic oil chambers are partitioned from each other by the seal ring which seals the annular passages, linked respectively with the hydraulic oil chambers, which are formed between the columnar shaft body and the vane member both formed at the side of the cover. By controlling the oil pressures of the hydraulic oil chambers, the housing and the vane member are rotated relative to each other. Thereby it is possible to transmit the driving force transmitted from the crankshaft to the camshaft (vane member) by freely changing the rotation phase of the camshaft.

In the seal ring for use in the variable valve timing system, the members to be sealed rotate relative to each other with the axes thereof being greatly misaligned with each other. Thus the clearance between the members to be sealed is set larger than the misalignment amount. Consequently the thickness of the seal ring mounted on the above-described portion is made inevitably large (2.5 to 3.5 mm) in its radial direction. Because the thickness of the seal ring in its radial direction is large, polytetrafluoroethylene (hereinafter referred to as PTFE) resin or the like is hitherto used as the material for use in the variable valve timing system because the polytetrafluoroethylene resin is resistant to breakage when the seal ring is expanded at a seal ring mounting time.

PRIOR ART DOCUMENTS

Patent Documents

Patent document 1: Japanese Patent Application Laid-Open Publication No. 2001-059574
Patent document 2: Japanese Patent Application Laid-Open Publication No. 2004-143971
Patent document 3: Japanese Patent Application Laid-Open Publication No. 2008-255823

SUMMARY OF THE INVENTION

Problem to be Solved by the Invention

In recent years, the seal ring for use in the variable valve timing system is demanded to achieve a small oil leak, a low degree of friction, and improved wear resistance. In a case where the material of the seal ring is a PTFE resin composition, the seal ring is produced by machining a compression molding material. In this case, there is a limitation in the degree of freedom of the configuration of the seal ring. Thereby it is difficult for the seal ring to have a construction capable of achieving a small oil leak because an abutment of the seal ring has a complicated configuration. In addition, it is difficult for lubrication grooves formed on the side surfaces of conventional seal rings to allow the seal rings to have a construction capable of achieving a low degree of friction. In a high PV (contact pressure (P)×sliding velocity (V)) condition, the wear resistance of the PTFE resin composition is inferior to injection moldable super engineering plastics such as a polyphenylene sulfide (hereinafter referred to as PPS) resin composition, a polyether ether ketone resin composition, and a thermoplastic polyimide resin composition.

The present invention has been made to deal with the above-described problems. Therefore it is an object of the present invention to provide a seal ring, for a variable valve timing system, which is resistant to breakage when the seal ring is expanded at a seal ring mounting time even in a case where the seal ring is thick and allowed to have a complicated configuration by performing injection molding and achieve a small oil leak, a low degree of friction, and improved wear resistance.

Means for Solving the Problem

In a variable valve timing system comprising a camshaft for driving an intake valve of an internal combustion engine and an exhaust valve thereof; an inner rotational body fixed to the camshaft; an outer rotational body making a rotational motion relative to the inner rotational body by supply of hydraulic oil at a time of altering opening and closing timings of the intake valve and the exhaust valve; and a shaft body mounted on an inner circumference of the inner rotational body concentrically with the inner rotational body and the outer rotational body, a seal ring of the present invention seals annular passages, formed between the inner rotational body and the shaft body, which serve as an oil passage of the hydraulic oil. The seal ring is formed by molding a PPS resin composition containing PPS resin as a main component thereof and an elastomer. The inner rotational body and the outer rotational body rotate on the shaft body (the outer rotational body does not make direct sliding contact with the shaft body). The "inner" of the inner rotational body and the "outer" of the outer rotational body mean the positional relationship as viewed from the shaft body.

The seal ring partitions the two annular passages linked respectively with a pair of hydraulic oil chambers constructed of the inner rotational body and the outer rotational body for allowing the rotational motion to be made.

The elastomer consists of a thermoplastic elastomer. The PPS resin composition contains 1 to 30% by volume of the elastomer for an entirety of the PPS resin composition.

The PPS resin composition contains 1 to 20% by volume of carbon fiber and 1 to 30% by volume of PTFE resin for an entirety thereof; and a remainder of the PPS resin composition consists of the elastomer and the PPS resin.

The carbon fiber is milled fiber whose average fiber length is 0.02 to 0.2 mm.

The seal ring is mounted on an annular groove formed on the shaft body or the inner rotational body and has a plurality of V-shaped concave portions partly formed at an end portion of an inner diameter side of each of both side surfaces, of the seal ring, which make sliding contact with side surfaces of the annular groove along a circumferential direction of the seal ring. The V-shaped concave portions are formed as a portion not in contact with the side surfaces of the annular groove.

Effect of the Invention

In the variable valve timing system, as the seal ring for sealing the annular passages formed between the shaft body and the inner rotational body fixed to the camshaft and constructing the relative rotational means in combination with the outer rotational body, the seal ring formed by molding the PPS resin composition containing the PPS resin as its main component and the elastomer is used. Therefore the seal ring has excellent toughness and can be prevented from being broken when it expands at a seal ring mounting time even in a case where the seal ring is thick. Further because the seal ring of the present invention meets the demand that the seal ring is indispensably required to be thick and achieves a small oil leak, the seal ring of the present invention can be preferably utilized to partition the two annular passages linked respectively with a pair of the hydraulic oil chambers for allowing the relative rotational motion to be made.

The elastomer consists of the thermoplastic elastomer. The PPS resin composition contains 1 to 30% by volume of the elastomer for the entirety thereof. Therefore the seal ring is allowed to have improved toughness and secure a sufficiently large limit diameter expansion amount as the seal ring for the variable valve timing system.

The PPS resin composition contains 1 to 20% by volume of the carbon fiber and 1 to 30% by volume of the PTFE resin for the entirety thereof. The remainder of the PPS resin composition consists of the elastomer and the PPS resin. Therefore the PPS resin composition has a high limit PV value and thus excellent friction and wear characteristics. Further because the carbon fiber consists of the milled fiber having the average fiber length of 0.02 to 0.2 mm, the PPS resin composition containing the milled fiber has a lower elastic modulus than the PPS resin composition containing chopped fiber and is thus resistant to breakage when the seal ring formed by molding the PPS resin composition expands at a seal ring mounting time. Supposing that the chopped fiber and the milled fiber are contained in the PPS resin composition in the same amount, the milled fiber has a larger number of fibers than the chopped fiber. Therefore the friction surface of the PPS resin composition containing the milled fiber has many load points. Thereby an oil film can be easily formed thereon, which allows the friction surface of the PPS resin composition to have a low coefficient of friction.

The seal ring is mounted on the annular groove formed on the shaft body or the inner rotational body and has a plurality of the V-shaped concave portions partly formed at the end portion of the inner diameter side of each of both side surfaces, of the seal ring, which make sliding contact with the side surfaces of the annular groove along the circumferential direction of the seal ring. The V-shaped concave portions are formed as the portion not in contact with the side surfaces of the annular groove. Thus the concave portions allow an appropriate amount of the hydraulic oil to flow in the sliding contact surfaces of the seal ring therethrough. Therefore the seal ring of the present invention is allowed to achieve a small oil leak and a low torque in a favorable balance.

MODE FOR CARRYING OUT THE INVENTION

Figure 1:
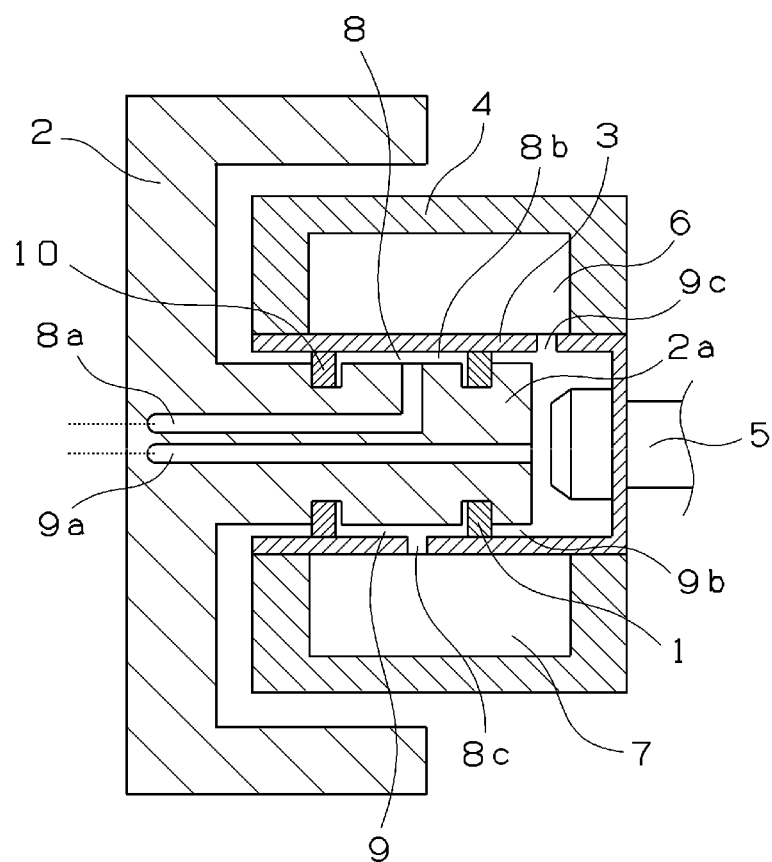
FIG. 1 is a schematic sectional view of a variable valve timing system in which the seal ring of the present invention is used.

One example of a variable valve timing system of an internal combustion engine to which the seal ring of the present invention is applied is described below with reference to FIG. 1. FIG. 1 is a schematic sectional view of the variable valve timing system. This system has a camshaft 5 for opening and closing an intake valve of the internal combustion engine and an exhaust valve thereof, an inner rotational body 3 (vane member) fixed to the camshaft 5, an outer rotational body 4 making a rotational motion relative to the inner rotational body 3, and a shaft body 2a mounted on an inner circumference of the inner rotational body 3 concentrically with the inner rotational body 3 and the outer rotational body 4. The outer rotational body 4 is rotated by a rotational power transmitted from a crankshaft which is the output shaft of the internal combustion engine via a chain and a belt. The shaft body 2a is formed integrally with a front cover 2 fixed to a cylinder head of the internal combustion engine. The shaft body 2a is approximately columnar. Inside passages 8a and 9a are formed inside the shaft body 2a. Hydraulic oil is supplied to hydraulic oil chambers from an externally disposed control part (not shown in FIG. 1) and discharged therefrom through the inside passages 8a and 9a.

The hydraulic oil is supplied to a pair of the hydraulic oil chambers 6 and 7 formed between the outer rotational body 4 and the inner rotational body 3 via hydraulic oil passages 8 and 9 respectively. The hydraulic oil passages 8 and 9 are formed of the above-described inside passages 8a and 9a, annular passages 8b and 9b, and passages 8c and 9c disposed inside the inner rotational body 3 respectively. At the time of altering valve opening and closing timings, the hydraulic oil is supplied to the hydraulic oil chambers 6 and 7 from the control part and discharged therefrom to adjust an oil pressure inside the hydraulic oil chambers 6 and 7 so that the inner rotational body 3 makes a rotational motion relative to the outer rotational body 4. Thereby the rotation phase of the camshaft 5 fixed to the inner rotational body 3 is retarded or advanced with respect to the outer rotational body 4 disposed at a crankshaft side so as to change a valve timing.

A seal ring 1 of the present invention seals the annular passages 8b and 9b, formed between the inner rotational body 3 and the shaft body 2a, which serves as the oil passage of the hydraulic oil. The seal ring 1 liquid-tightly partitions the annular passages 8b and 9b constituting the two hydraulic oil passages 8 and 9 linked with a pair of the hydraulic oil chambers 6 and 7 respectively. Therefore when the hydraulic oil pressure of the hydraulic oil chamber 6 and that of the hydraulic oil chamber 7 alternately fluctuate, it is necessary for the seal ring to maintain its sealing performance while the seal ring is being subjected to the fluctuation of the hydraulic oil pressure. The variable valve timing system is provided with an auxiliary seal ring 10 for sealing an air release side of the hydraulic oil passages. The seal ring 1 of the present invention can be utilized as the auxiliary seal ring 10. Each seal ring is mounted on a sectionally rectangular annular groove formed on the shaft body 2a.

Figure 2:
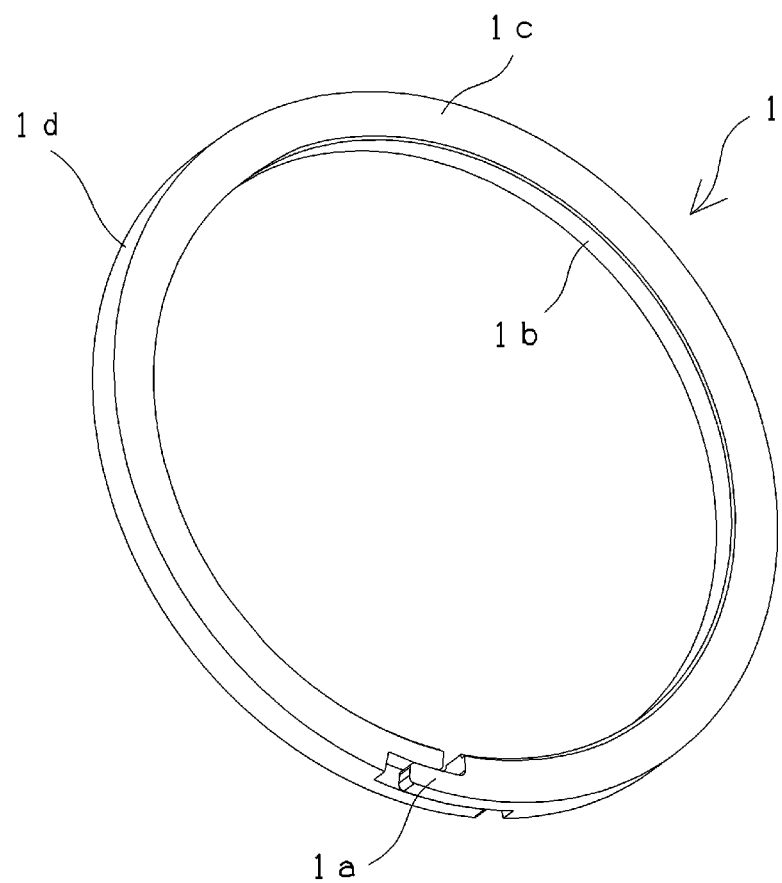
FIG. 2 is a perspective view of the seal ring shown in FIG. 1.

FIG. 2 is a perspective view showing the seal ring of the present invention. As shown in FIG. 2, the seal ring 1 is an annular body approximately rectangular in a sectional view. Corners formed between an inner circumferential surface 1b of the seal ring and both side surfaces 1c thereof may be chamfered linearly or curvingly. In producing the seal ring by injection molding, a stepped portion to be projected from a die may be formed at each of the above-described corners. The seal ring 1 is of a cut type having one abutment 1a. The seal ring 1 is mounted on the above-described annular groove owing to an increase in its diameter caused by elastic deformation. Because the seal ring 1 has the abutment 1a, the diameter thereof is increased by the hydraulic pressure of the hydraulic oil during the use of the seal ring. Thereby an outer circumferential surface 1d of the seal ring closely contacts an inner circumferential surface of the inner rotational body. Regarding the configuration of the abutment 1a, it is possible to adopt a straight-cut type, an angle-cut type, and the like. But it is preferable to adopt a complex cut type shown in FIG. 2 because the seal ring of the complex cut type is excellent in its oil-sealing performance. In the present invention, the seal ring is formed not of the PPS resin composition, but of the predetermined elastomer-containing PPS resin composition. Therefore it is possible to easily form the abutment having a complicated configuration by injection molding the PPS resin composition and thus allow the seal ring to achieve a small oil leak.

In the seal ring of the present invention, to cope with the above-described axis misalignment and the like, it is necessary to increase the thickness of the seal ring in its radial direction. Specifically, the thickness of the seal ring is set to favorably 2.0 to 4.0 mm and more favorably 2.5 to 3.5 mm. The outside diameter of the seal ring is set to φ20 mm to φ50 mm. Engine oil is used as the hydraulic oil to be sealed. The oil temperature is set to 30 to 150° C. The oil pressure is set to 0.5 to 3.0 MPa. The number of rotations of the rotational shaft is set to 1000 to 7000 rpm.

Figure 3:
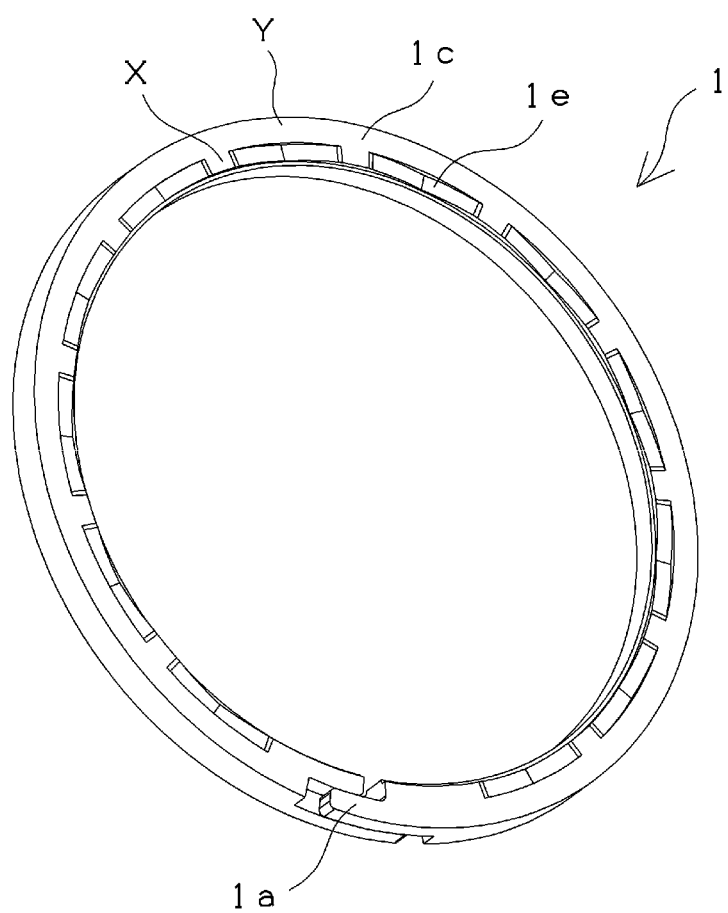
FIG. 3 is a perspective view showing another example (V-shaped groove is formed on seal ring) of the seal ring of the present invention.

FIG. 3 shows another example (V-shaped groove is formed on the seal ring) of the seal ring of the present invention. As shown in FIG. 3, the seal ring 1 of this form having one abutment 1a is an annular body approximately rectangular in a sectional view. A plurality of V-shaped concave portions 1e is formed along a circumferential direction of the seal ring. The V-shaped concave portions 1e is formed at an end portion of an inner diameter side of each of both side surfaces 1c of the seal ring. The side surfaces of the seal ring 1 are formed as sliding contact surfaces which slidably contact sidewall surfaces of the above-described annular groove. The V-shaped concave portions 1e formed on the side surfaces (sliding contact surfaces) of the seal ring are formed as portions not in contact with the sidewall surfaces of the annular groove. The concave portions 1e allow an appropriate amount of the hydraulic oil to flow into the sliding contact surfaces of the seal ring therethrough. In more detail, boundary portions disposed between a sliding contact surface X disposed between adjacent concave portions and the concave portions have a continuous configuration, whereas boundary portions between a sliding contact surface Y disposed outward from the concave portions and the concave portions have an uncontinuous configuration (stepped configuration). Thus it is easy for the hydraulic oil to flow to the sliding contact surface X, whereas it is more difficult for the hydraulic oil to flow to the sliding contact surface Y than the case in which the hydraulic oil flows to the sliding contact surface X. Owing to the flow of the hydraulic oil to the sliding contact surfaces X and Y, it is possible to form an oil film on the sliding contact surfaces and thus achieve a low torque and a low wear. In addition, the restraining of a large amount of the hydraulic oil from flowing to the sliding contact surface Y leads to the achievement of a small oil leak. It is possible to form the concave portions on one side surface of the seal ring or both side surfaces thereof as necessary.

The seal ring of the present invention is a resin molded body formed by molding the PPS resin composition containing PPS resin as its main component and the elastomer. Although the PPS resin composition may contain resin other than the PPS resin and the elastomer, the PPS resin composition contains the PPS resin as its main component (base resin). That is, the PPS resin composition contains the PPS resin at a higher ratio than any other resin component contained therein.

The PPS resin is crystalline thermoplastic resin having a polymer structure, shown below by a chemical formula (1), in which benzene rings are linked with each other at the para positions thereof by sulfur bond. Because the PPS resin has a melting point at about 280° C. and is excellent in its chemical resistance, the PPS resin can be used even in a case in which the temperature of the hydraulic oil to be sealed is high. Examples of the PPS resin include crosslinked PPS resin and semi-crosslinked PPS resin obtained by performing oxidative crosslinking resins having low-molecular weights and straight-chain PPS resin not having a crosslinked structure. In the present invention, the PPS resin can be used without being restricted in the molecular structure and molecular weight thereof. It is preferable to use the straight-chain PPS resin excellent in its toughness because the seal ring containing the straight-chain PPS resin expands in its diameter in mounting the seal ring on the groove.

[Chemical formula 1]

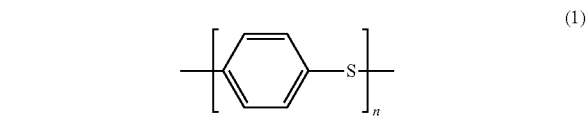

(1)

The elastomer is added to the PPS resin to improve the toughness of the seal ring and thereby improve the limit diameter expansion amount thereof. The seal ring for the variable valve timing system is thick in its radial direction. Accordingly the diameter expansion amount of the seal ring becomes large at a seal ring mounting time. In a case where the PPS resin not containing the elastomer is singly used as the base resin of the PPS resin composition, there is a fear that the PPS resin composition cannot obtain a sufficient limit diameter expansion amount for the variable valve timing system. By adding the elastomer to the PPS resin, it is possible to deal with this problem.

As the elastomer, although it is possible to use both thermosetting elastomer and thermoplastic elastomer, the latter is more favorable than the former because the latter is capable of enhancing the toughness of the PPS resin to a higher extent. As the thermoplastic elastomer which can be used in the present invention, a polyamide-based elastomer, a polyurethane-based elastomer, a polyester-based elastomer, a polystyrene-based elastomer, and an olefin-based elastomer are listed. It is preferable that the decomposition starting temperature of the thermoplastic elastomer is not less than the molding temperature (280 to 320° C.) of the PPS resin. The decomposition of the PPS resin having a low-molecular weight is permitted at a time when the seal ring is formed by molding the PPS resin composition.

The mixing ratio of the elastomer to the entire PPS resin composition is set to favorably 1 to 30% by volume and more favorably 1 to 10% by volume. In a case where the mixing ratio of the elastomer exceeds 30% by volume, the mold shrinkage factor of the PPS resin composition becomes so high that the PPS resin composition may not obtain a sufficient dimensional accuracy. On the other hand, in a case where the mixing ratio of the elastomer is less than 1% by volume, there is a fear that the PPS resin composition may not sufficiently obtain the effect of improving the toughness thereof.

It is possible to adopt a mode of kneading a commercially available pellet consisting of the elastomer-containing PPS resin and side-fed other reinforcing materials (carbon fiber and PTFE resin to be described later) by using a twin screw extruder at a molding time. As the commercially available pellet, consisting of the elastomer-containing PPS resin, which can be used in the present invention, Z-200-E5, FZ-2100-A1, Z-200-J1, and Z-300 produced by DIC Corporation; and A670T05 and A670X01 produced by Toray Industries, Inc. are listed.

The PPS resin composition may contain a fibrous reinforcing material such as carbon fiber, glass fiber, and aramid fiber; a spherical filler such as spherical silica and spherical carbon; a scaly reinforcing material such as mica and talc; and a fine fibrous reinforcing material such as potassium titanate whisker. The PPS resin composition may also contain a solid lubricant such as the PTFE resin, graphite, tungsten disulfide, molybdenum disulfide, and boron nitride; a sliding reinforcing material such as calcium phosphate and calcium sulfate; and a colorant such as carbon powder, iron oxide, and titanium oxide. The above-described reinforcing materials and agents can be added to the PPS resin singly or in combination.

Of the above-described reinforcing materials and agents, the PPS resin composition containing the carbon fiber which is a fibrous reinforcing material and the PTFE resin which is a solid lubricant is preferable, because the PPS resin composition containing the above-described materials provides characteristics demanded for the seal ring of the present invention. It is possible to improve the mechanical strength such as a bending elastic modulus of the PPS resin composition containing the carbon fiber. It is possible to improve the sliding contact characteristic of the PPS resin composition containing the PTFE resin.

It is possible to use both pitch-based and PAN-based carbon fibers classified according to raw materials of the carbon fiber. Although the firing temperature of the carbon fiber is not specifically limited, carbonized products fired at 1000 to 1500° C. is more favorable than graphitized products fired at a high temperature of 2000° C. or higher. This is because even under a high PV, the former is unlikely to abrasively wear the groove on which the seal ring is to be mounted. Although both chopped fiber and milled fiber can be used as the carbon fiber, the milled fiber is more favorable than the chopped fiber. This is because supposing that the chopped fiber and the milled fiber are contained in the PPS resin composition in the same amount, the milled fiber has a larger number of fibers than the chopped fiber and allows an oil film to be formed more easily than the chopped fiber. To enhance the adhesion between the carbon fiber and the PPS resin and improve the mechanical characteristic of the seal ring, the surface of the carbon fiber may be treated with a treating agent containing epoxy resin, polyamide-based resin or the like or with a silane coupling agent or the like.

It is preferable to set the average fiber diameter of the carbon fiber to not more than 20 μm. When the average fiber diameter of the carbon fiber exceeds 20 μm, the groove on which the seal ring is to be mounted may be likely to be subjected to the abrasive wear to a high extent in a case where the material of the shaft body is an aluminum alloy or an unquenched steel material. It is preferable to set the average fiber length of the carbon fiber to 0.02 to 0.2 mm. In a case where the average fiber length thereof is less than 0.02 mm, the PPS resin composition is incapable of obtaining a sufficient reinforcing effect. Thus the PPS resin composition may be likely to have inferior wear resistance. In a case where the average fiber length thereof exceeds 0.2 mm, the PPS resin composition has a high modulus of elasticity, which is not preferable from the standpoint of mountability of the seal ring.

Examples of the commercially available pitch-based carbon fiber which can be used in the present invention include Kreca M-101S, M-101F, and M-201S produced by KUREHA CORPORATION. As the PAN-based carbon fiber commercially available, Beth Fight HT M100 160MU and HT M100 40MU produced by Toho Tenax Co., Ltd.; and Toreca MLD-30 and MLD-300 produced by Toray Industries, Inc. are listed.

It is possible to adopt any of molding powder produced by a suspension polymerization method, fine powder produced by an emulsion polymerization method, and reprocessed PTFE. To stabilize the flowability of the PPS resin composition, it is preferable to adopt the reprocessed PTFE because it is difficult to fiberize the reprocessed PTFE by shear at a molding time and increase its melt viscosity. The reprocessed PTFE means powder heat-treated (subjected to thermal history) and powder irradiated with γ-rays or electron beams. Examples of the reprocessed PTFE includes powder obtained by heat-treating the molding powder or the fine powder, powder obtained by irradiating this powder with the γ-rays or the electron beams, powder obtained by pulverizing a molded body of the molding powder or the fine powder, powder formed by irradiating the powder obtained by pulverizing the molded body of the molding powder or the fine powder with the γ-rays or the electron beams, and powder obtained by irradiating the molding powder or the fine powder with the γ-rays or the electron beams. It is preferable to adopt the PTFE resin obtained by irradiating the powder with the γ-rays or the electron beams, because the PTFE resin obtained in this way neither coheres nor is fiberized at the melting temperature of the PPS resin, has an internal lubricating effect, and is capable of stabilizing and improving the flowability of the PPS resin composition.

Examples of commercially available PTFE resin which can be used in the present invention include KTL-610, KTL-450, KTL-350, KTL-8N, and KTL-400H produced by Kitamura Ltd.; Teflon (registered trademark) 7-J and TLP-10 produced by Du Pont-Mitsui Fluorochemicals Co., Ltd.; Fluon G163, L150J, L169J, L170J, L172J, and L173J produced by Asahi Glass Co., Ltd.; Polyflon M-15 and Lubron L-5 produced by Daikin Industries Ltd.; Dyneon TF9205 and TF9207 produced by Sumitomo 3M Limited. In addition, it is possible to use PTFE resin modified by a perfluoroalkylether group, a fluoroalkyl group or side chain groups having the fluoroalkyl group.

It is preferable to set the mixing ratio of the carbon fiber to 1 to 20% by volume and that of the PTFE resin to 1 to 30% by volume for the entire PPS resin composition and compose the remainder of the elastomer-containing PPS resin. As described above, it is preferable to set the mixing ratio of the elastomer to be contained in the elastomer-containing PPS resin to 1 to 30% by volume for the entire PPS resin composition. When the mixing ratio of the carbon fiber exceeds 20% by volume, the groove where the seal ring is to be mounted may be abrasively worn in a case where the material of the shaft body is an aluminum alloy or an unquenched steal material. In a case where the mixing ratio of the PTFE resin exceeds 30% by volume, there is a fear that the wear resistance and creep resistance of the PPS resin composition may be lower than a necessary extent. In a case where the mixing ratio of the PTFE resin is less than 1% by volume, there is a fear that it is impossible to impart a necessary lubricity and a sufficient sliding contact characteristic to the PPS resin composition.

Means for mixing the above-described raw materials with one another and kneading them are not specifically limited. As described above, by using a twin screw extruder, a commercially available pellet consisting of the elastomer-containing PPS resin may be kneaded together with the side-fed carbon fiber and PTFE resin. In addition, it is possible to obtain a molding pellet (granule) by dry blending only powder materials by using a Henschel mixer, a ball mixer, a ribbon blender, a Lodige mixer or an ultra Henschel mixer and melting and kneading the dry blended materials by using a melt extruder such as a twin screw extruder. As a molding method, it is preferable to adopt an injection molding method because the injection molding method is capable of easily forming the abutment having a complicated configuration and the grooves on side surfaces of the seal ring. Treatment such as annealing treatment may be adopted to improve the properties of molded products.

In producing the seal ring by injection molding the materials thereof, a gate position is not specifically limited. But it is preferable to set the gate position at the inner circumferential side of the seal ring from the standpoint of securing the sealing performance thereof and the elimination of post processing. It is preferable to set the gate position opposed to a portion, of the abutment, which is disposed at the inner circumferential side of the seal ring from the standpoint of a flow balance in the injection molding.

It is preferable to set the bending elastic modulus (ASTM conforming to D790) of the PPS resin composition forming the seal ring of the present invention to not more than 4500 MPa at a normal temperature. In a case where the bending elastic modulus of the PPS resin composition exceeds 4500 MPa, a clearance is liable to be formed between the inner circumferential surface of the inner rotational body and the outer circumferential surface of the seal ring when an oil pressure acts on the seal ring, which may deteriorate the sealing performance of the seal ring. It is also preferable to set the bending deflection (ASTM conforming to D790) of the PPS resin composition to not less than 4% at a normal temperature. In a case where the bending deflection thereof is less than 4%, the seal ring may be damaged at a seal ring mounting time.

EXAMPLES

Raw materials for resin layers to be used in examples and comparative examples are shown altogether below.

(1) Elastomer-containing polyphenylene sulfide [PPS-ER-1] produced by DIC Corporation: Z-200-E5

(2) Elastomer-containing polyphenylene sulfide [PPS-ER-2] produced by Toray Industries, Inc.: A670T05

(3) Elastomer-containing polyphenylene sulfide [PPS-ER-3] produced by DIC Corporation: Z-200-J1

(4) Elastomer-containing polyphenylene sulfide [PPS-ER-4] produced by Toray Industries, Inc.: A670X01

(5) Polyphenylene sulfide [PPS-1] produced by DIC Corporation: MA-520

(6) Polyphenylene sulfide [PPS-2] produced by DIC Corporation: T-4AG (7) Pitch-based carbon fiber [CF] Kreca M-101S (average fiber length: 0.13 mm, average fiber diameter: 14.5 μm) produced by KUREHA CORPORATION (8) Polytetrafluoroethylene [PTFE] KTL-610 (reprocessed PTFE) produced by Kitamura Ltd.

The above-described raw materials used at the mixing ratios (% by volume) shown in tables 1 and 2 were melted and kneaded by using a twin screw extruder to prepare pellets.

TABLE 1

| | Examples | | | | | | | |
|---|---|---|---|---|---|---|---|---|
| Raw material (% by volume) | a | b | c | d | e | f | g | h |
| PPS-ER-1 PPS Elastomer | 77 3 | 67 3 | — — | — — | — — | — — | — — | — — |
| PPS-ER-2 PPS Elastomer | — — | — — | 74 6 | 65 5 | — — | — — | — — | — — |
| PPS-ER-3 PPS Elastomer | — — | — — | — — | — — | 64 16 | 56 14 | — — | — — |
| PPS-ER-4 PPS Elastomer | — — | — — | — — | — — | — — | — — | 59 21 | 52 18 |
| CF | 10 | 10 | 10 | 10 | 10 | 10 | 10 | 10 |
| PTFE | 10 | 20 | 10 | 20 | 10 | 20 | 10 | 20 |

TABLE 2

| | Comparative examples | | | | | |
|---|---|---|---|---|---|---|
| Raw material (% by volume) | a | b | c | d | e | f |
| PPS-1 | 80 | — | 70 | — | 70 | — |
| PPS-2 | — | 80 | — | 70 | — | 70 |
| CF | 10 | 10 | 20 | 20 | 30 | 30 |
| PTFE | 10 | 10 | 10 | 10 | — | — |

(1) Bending Test

Specimens were prepared by molding the above-described pellets to conduct a bending test (conforming to ASTM D790). Table 3 shows bending elastic moduli and bending deflections.

TABLE 3

| | | Bending elastic modulus MPa | Bending deflection % |
|---|---|---|---|
| Examples | a | 4000 | 4.5 |
| | b | 3620 | 4.2 |
| | c | 3500 | 5.8 |
| | d | 3350 | 5.2 |
| | e | 3400 | 5.9 |
| | f | 3360 | 5.8 |
| | g | 3100 | 6.2 |
| | h | 2930 | 6.1 |

TABLE 3-continued

|  |  | Bending elastic modulus MPa | Bending deflection % |
|---|---|---|---|
| Comparative examples | a | 4300 | 3.5 |
|  | b | 4700 | 3.1 |
|  | c | 5350 | 2.3 |
|  | d | 5510 | 2.2 |
|  | e | 6920 | 1.6 |
|  | f | 7000 | 1.6 |

(2) Expansion Test of Seal Ring

Figure 4:
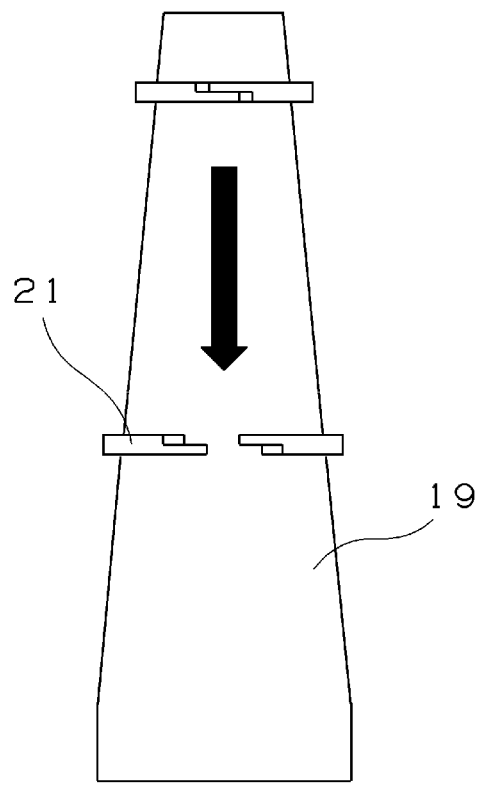
FIG. 4 shows a method of testing the expansion of the seal ring.
Figure 5:
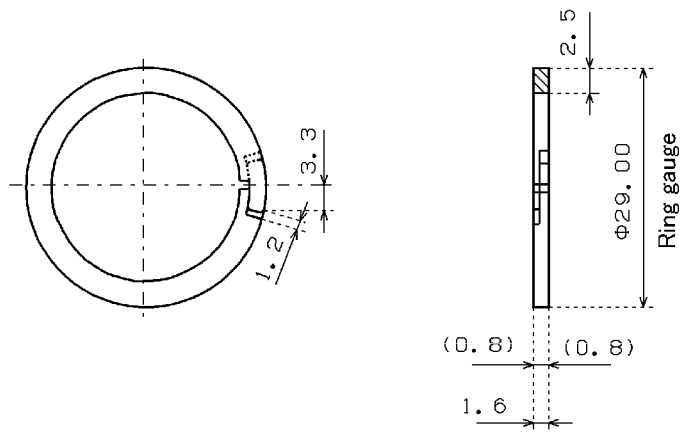
FIG. 5 shows the dimension of a test seal ring and that of a taper jig.
Figure 5:
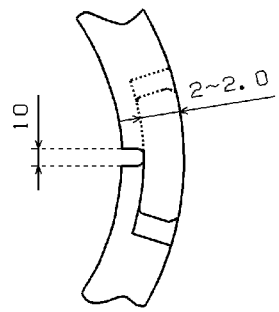
Figure 5:
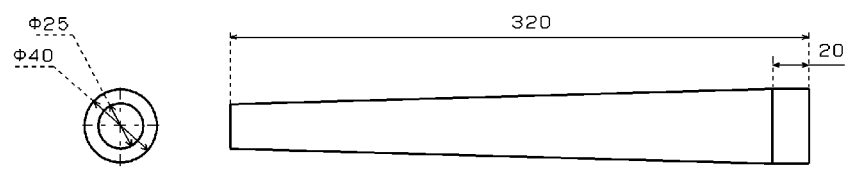

By using the pellets, seal rings having an outer diameter of φ29 mm×an inner diameter of φ24 mm (thickness: 2.5 mm)×a width of 1.6 mm were produced by injection molding. As shown in FIG. 4, seal rings 21 were inserted into a taper jig 19 at a speed of 1 mm/s to measure the dimension of the inner diameters (=limit diameter expansion amount) of seal rings when they were broken. Detailed dimensions of the seal rings and the taper jig used are as shown in FIG. 5. Table 4 shows test results.

TABLE 4

|  |  | Limit diameter expansion amount mm | Judgment[Note] |
|---|---|---|---|
| Examples | a | Φ37.2 | ◉ |
|  | b | Φ35.1 | ◉ |
|  | c | Φ37.8 | ◉ |
|  | d | Φ35.3 | ◉ |
|  | e | Φ39.2 | ◉ |
|  | f | Φ37.0 | ◉ |
|  | g | Φ39.8 | ◉ |
|  | h | Φ37.3 | ◉ |
| Comparative examples | a | Φ30.2 | ○ |
|  | b | Φ29.4 | ○ |
|  | c | Φ28.2 | Δ |
|  | d | Φ28.0 | Δ |
|  | e | Φ27.5 | Δ |
|  | f | Φ27.4 | Δ |

[Note] ◉: Excellent (Expansion rate: not less than 130%) ○: Good (Expansion rate: not less than 120% and less than 130%) Δ: Inferior (Expansion rate: less than 120%)

(3) Endurance Test of Seal Ring

Figure 6:
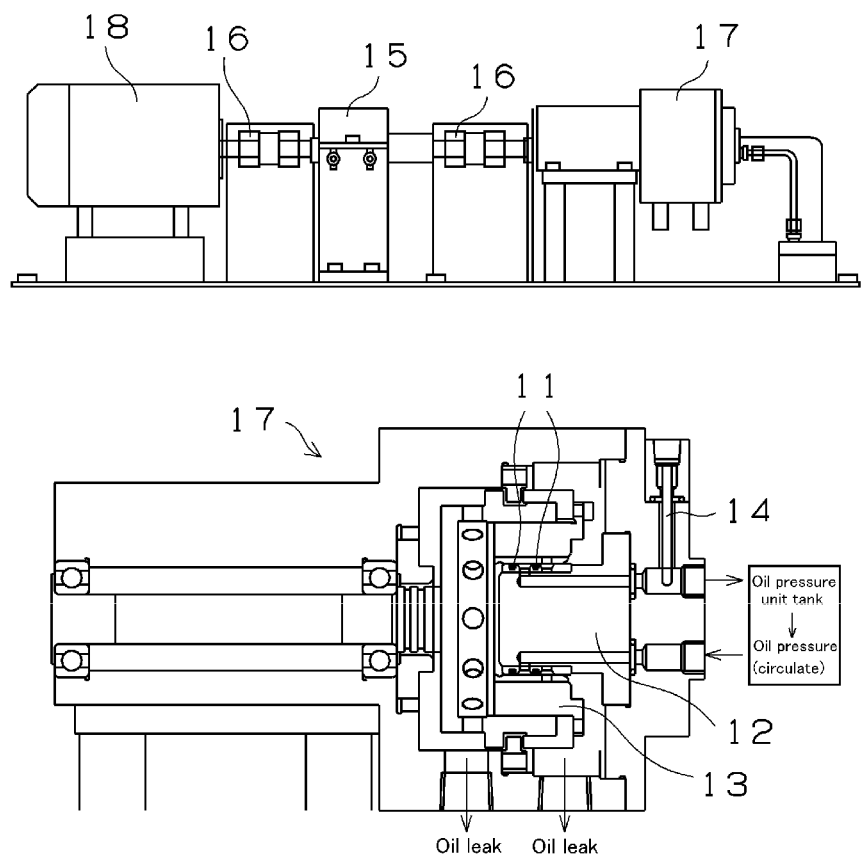
FIG. 6 is a schematic view of a test machine for the seal ring.

To examine the characteristics of the obtained seal rings, an endurance test of the seal rings was conducted by using a test machine shown in FIG. 6. FIG. 6 is a schematic view of the test machine. The test machine is constructed of a motor 18, a coupling 16, a rotation torque meter 15, and a test head 17. In the test head 17, two seal rings 11 were mounted on an annular groove of a mating shaft 12. The seal ring 11 has a form of making sliding contact with a sidewall of the annular groove of the mating shaft 12 and the inner circumferential surface of a shaft hole of a housing 13. Oil was supplied to an annular gap between the two seal rings 11 by feeding the oil thereto under pressure from a right-hand side of the apparatus. Reference numeral 14 denotes an oil thermometer. Detailed test conditions are as shown in table 5 below. The seal rings used in the test had the outer diameter of φ29 mm×the inner diameter of φ24 mm (thickness: 2.5 mm)×the width of 1.6 mm (see FIG. 5(*a*))

By using the test machine, an oil leak amount (ml/min) of each seal ring, a rotation torque (N·m) of the mating shaft, and a wear volume (depth of wear, μm) of a side surface of each seal ring and that of a groove thereof were measured. The oil leak amounts and the rotation torques were measured at an initial time (start time in test) and after the test finished (after the lapse of 250 hours from the start of the test). The wear volumes were measured after the lapse of 250 hours from the start of the test. Table 6 shows test results.

TABLE 5

|  | Condition in endurance test | Oil leak amount, Condition in measuring rotation torque |
|---|---|---|
| Oil pressure | 0 (2 s) ↔ 0.7 MPa (2 s) | 0.7 MPa |
| Number of rotations | 3,400 min$^{-1}$ | ← |
| Oil temperature | 110 degrees C. | ← |
| Evaluation time period | 250 hours | Initial time, after test |
| Test oil | Engine oil | ← |
| Shaft | ADC 12 | ← |
| Housing | Iron-based | ← |

TABLE 6

|  |  | Wear of side surface of seal ring μm | Wear of groove of seal ring μm | Oil leak amount cc/min | | Rotation torque N·m (two seal rings) | |
|---|---|---|---|---|---|---|---|
|  |  |  |  | Initial time | After test | Initial time | After test |
| Examples | a | <5 | <5 | <1 | <1 | 0.12 | 0.13 |
|  | b | <5 | <5 | <1 | <1 | 0.12 | 0.12 |
|  | c | <5 | <5 | <1 | <1 | 0.12 | 0.13 |
|  | d | <5 | <5 | <1 | <1 | 0.13 | 0.14 |
|  | e | 10 | <5 | <1 | <1 | 0.16 | 0.17 |
|  | f | 9 | <5 | <1 | <1 | 0.16 | 0.17 |
|  | g | 13 | <5 | <1 | <1 | 0.15 | 0.17 |
|  | h | 14 | <5 | <1 | <1 | 0.17 | 0.17 |
| Comparative examples | a | <5 | <5 | <1 | <1 | 0.12 | 0.13 |
|  | b | <5 | <5 | <1 | <1 | 0.13 | 0.13 |
|  | c | <5 | 10 | 6 | 10 | 0.11 | 0.11 |
|  | d | <5 | 8 | 7 | 6 | 0.10 | 0.12 |
|  | e | Data was not obtained because seal rings were broken at a mounting time. | | | | | |
|  | f |  | | | | | |

As shown in table 3, each of the seal rings of the examples a through h had a bending elastic modulus not more than 4500 MPa and a bending deflection not less than 4%. As shown in table 4, each of the seal rings of the examples a through h had an expansion rate not less than 130% and a limit diameter expansion amount larger than φ35 mm. On the other hand, each of the seal rings of the comparative examples a through f had an expansion rate less than 130%. As shown in table 6, the seal rings of the examples a through d and those of the comparative examples a through d had very small values in the wear of the side surfaces and grooves thereof and the oil leak amounts thereof. As described above, the seal rings of the comparative examples a through d were inferior to those of the examples a through h in the limit diameter expansion amounts thereof. Because the seal rings of the comparative examples e and f were broken at a seal ring-mounting time, tests could not be conducted. As shown in table 6, although the side surfaces of the seal rings of the examples e through h wore in the amount of 9 to 14 μm, the oil leak amounts thereof measured after the test finished were less than 1 cc/minute. Thus it was judged that the seal rings of the examples e through h did not have problems.

INDUSTRIAL APPLICABILITY

The seal ring of the present invention is resistant to breakage when the seal ring is expanded at a seal ring mounting time even in a case where the seal ring is thick and allowed to have a complicated configuration by performing injection molding and achieve a small oil leak, a low degree of friction, and improved wear resistance. Therefore the seal ring can be preferably utilized to seal the hydraulic oil in the annular passages of the variable valve timing system for controlling the opening and closing timings of the intake valve of the internal combustion engine and the exhaust valve thereof.

EXPLANATION OF REFERENCE NUMERALS AND SYMBOLS 1, 11, 21: seal ring
2: front cover
3: inner rotational body
4: outer rotational body
5: camshaft
6, 7: hydraulic oil chamber
8, 9: hydraulic oil passage
10: auxiliary seal ring
12: mating shaft
13: housing
14: thermometer
15: rotation torque meter
16: coupling
17: test head
18: motor
19: taper jig

The invention claimed is:

1. In a variable valve timing system comprising a camshaft for driving an intake valve of an internal combustion engine and an exhaust valve thereof; an inner rotational body fixed to said camshaft; an outer rotational body making a rotational motion relative to said inner rotational body by supply of hydraulic oil at a time of altering opening and closing timings of said intake valve and said exhaust valve; and a shaft body mounted on an inner circumference of said inner rotational body concentrically with said inner rotational body and said outer rotational body, a seal ring seals annular passages, formed between said inner rotational body and said shaft body, which serve as an oil passage of said hydraulic oil,
    wherein said seal ring is formed by molding a polyphenylene sulfide resin composition containing polyphenylene sulfide resin as a main component thereof and an elastomer,
    wherein said polyphenylene sulfide resin composition contains 1 to 20% by volume of carbon fiber and 1 to 30% by volume of polytetrafluoroethylene resin for an entirety thereof; and a remainder of said polyphenylene sulfide resin composition consists of said elastomer and said polyphenylene sulfide resin.

2. A seal ring of said variable valve timing system according to claim 1, which partitions said annular passages linked respectively with a pair of hydraulic oil chambers constructed of said inner rotational body and said outer rotational body for allowing said rotational motion to be made.

3. A seal ring of said variable valve timing system according to claim 1, wherein said elastomer consists of a thermoplastic elastomer; and
    said polyphenylene sulfide resin composition contains 1 to 30% by volume of said elastomer for an entirety of said polyphenylene sulfide resin composition.

4. A seal ring of said variable valve timing system according to claim 1, wherein said carbon fiber is milled fiber whose average fiber length is 0.02 to 0.2 mm.

5. In a variable valve timing system comprising a camshaft for driving an intake valve of an internal combustion engine and an exhaust valve thereof; an inner rotational body fixed to said camshaft; an outer rotational body making a rotational motion relative to said inner rotational body by supply of hydraulic oil at a time of altering opening and closing timings of said intake valve and said exhaust valve; and a shaft body mounted on an inner circumference of said inner rotational body concentrically with said inner rotational body and said outer rotational body, a seal ring seals annular passages, formed between said inner rotational body and said shaft body, which serve as an oil passage of said hydraulic oil,
    wherein said seal ring is formed by molding a polyphenylene sulfide resin composition containing polyphenylene sulfide resin as a main component thereof and an elastomer,
    wherein said seal ring is mounted on an annular groove formed on said shaft body or said inner rotational body and has a plurality of V-shaped concave portions along a circumferential direction of said seal ring,
    wherein said V-shaped concave portions are partly formed at an end portion of an inner diameter side of each of both side surfaces of said seal ring which make sliding contact with side surfaces of said annular groove, and
    wherein said V-shaped concave portions are formed as a portion not in contact with said side surfaces of said annular groove.

* * * * *